(12) United States Patent
Sugaya (10) Patent No.: US 8,984,408 B2
(45) Date of Patent: Mar. 17, 2015

(54) OPERATOR SYSTEM, REMOTE SUPPORT METHOD, AND PROGRAM FOR THE OPERATOR SYSTEM

(71) Applicant: OPTiM Corporation, Saga-shi (JP)

(72) Inventor: Shunji Sugaya, Tokyo (JP)

(73) Assignee: OPTiM Corporation, Saga-Shi (JP)

( * ) Notice: Subject to any disclaimer, the term of this patent is extended or adjusted under 35 U.S.C. 154(b) by 112 days.

(21) Appl. No.: 13/648,232

(22) Filed: Oct. 9, 2012

(65) Prior Publication Data

US 2013/0298032 A1    Nov. 7, 2013

(30) Foreign Application Priority Data

May 2, 2012    (JP) .................................. 2012-105167

(51) Int. Cl.
*G06F 15/177*    (2006.01)
*H04L 12/24*    (2006.01)
*H04L 29/06*    (2006.01)

(52) U.S. Cl.
CPC ........ *H04L 41/0879* (2013.01); *H04L 41/5064* (2013.01); *H04L 41/22* (2013.01); *H04L 41/12* (2013.01); *H04L 69/24* (2013.01)
USPC .......................................... 715/736; 715/734

(58) Field of Classification Search
None
See application file for complete search history.

(56) References Cited

U.S. PATENT DOCUMENTS

| | | | |
|---|---|---|---|
| 2004/0139156 A1* | 7/2004 | Matthews et al. | 709/204 |
| 2004/0181579 A1* | 9/2004 | Huck et al. | 709/205 |
| 2007/0124685 A1* | 5/2007 | Guillermo et al. | 715/740 |
| 2007/0156689 A1* | 7/2007 | Meek et al. | 707/8 |
| 2008/0016155 A1* | 1/2008 | Khalatian | 709/204 |
| 2008/0275971 A1* | 11/2008 | Pretlove et al. | 709/222 |
| 2009/0247136 A1* | 10/2009 | Srinivasan et al. | 455/414.2 |
| 2010/0125526 A1* | 5/2010 | Hurley et al. | 705/80 |
| 2011/0258307 A1* | 10/2011 | Konopka et al. | 709/223 |
| 2012/0173622 A1* | 7/2012 | Toledano et al. | 709/204 |
| 2012/0317487 A1* | 12/2012 | Lieb et al. | 715/730 |
| 2013/0290863 A1* | 10/2013 | Chen et al. | 715/747 |

* cited by examiner

*Primary Examiner* — Matt Kim
*Assistant Examiner* — Hua Lu
(74) *Attorney, Agent, or Firm* — Lexyoume IP Meister, PLLC (57) ABSTRACT

An operator system, an operator server, and a remote support method, and a program for the operator system are provided, which are capable of receiving input of user action for ongoing support operation. While an operator is carrying out support operation for an electric appliance 10, user action input by a user, such as forcing to stop the support operation or starting to save the support operation, is processed by an operator server. Accordingly, the operator server 200 fulfills the function of the operator system 1 based on user's intention. In addition, displaying a network map showing support operation information on the electric appliance 10 allows a user to easily know the status of the support operation, contributing to user's appropriate decision making.

15 Claims, 10 Drawing Sheets

OPERATOR SYSTEM, REMOTE SUPPORT METHOD, AND PROGRAM FOR THE
OPERATOR SYSTEM

This application is based on and claims the benefit of priority from Japanese Patent Application No. 2012-105167, filed on 2 May 2012, the content of which is incorporated herein by reference.

TECHNICAL FIELD

The present invention relates to an operator system, a remote support method, and a program for the operator system.

BACKGROUND ART

In recent years of electric appliances for home and business uses, the functions have been highly sophisticated and complicated, and then it often takes time for users to become familiar with all the functions. For example, even if a function that a user desires to use is mounted on an electric appliance, the user may not know how to call the function or may configure an inapposite setting, so that the user cannot use the function.

For approaching this problem, there has been a known method of remotely supporting (maintaining) a user's terminal from an operator to remotely configure the user's terminal and to remotely guide the user of the terminal. In particular, during the remote support, to achieve accountability to the user, to provide the user with a sense of ease, and to save the cost to visualize the guidance, the support operation is displayed on a screen that a user can view.

For example, a method of sharing a screen between a user terminal and a support terminal, preventing private information and confidential information from being divulged to an operator who views the shared screen (PLT 1).

CITATION LIST

Patent Literature

PLT 1: Japanese Unexamined Patent Application Publication 2011-248761
PLT2: Japanese Unexamined Patent Application Publication 2010-97587

SUMMARY OF INVENTION

However, in the method described in PLT 1, a user can merely have a blinder on the contents displayed on the screen of the user terminal and cannot have an active influence on the processing executed by an operator server or by an operator terminal during support operation. Specifically, even when a user noticed during support operation that a wrong setting that the user itself had configured in the past might cause the corruption of important data stored in the user terminal, the user could not force to stop the support operation. Furthermore, even if a user desired to reproduce support operation carried out for herself or himself, the screen could not be recorded during the support operation, or the input of the mouse or the key from the operator terminal could not be saved.

On the other hand, phone conversations between a user and an operator, support operation conducted by an operator, and the like may be saved for the purpose to avoid further trouble and the like. However, the saved data should not be freely accessed but is handled as evidence, which is greatly different from the recorded data desired from a user as described above.

Therefore, in the remote support, the functions desired from a user, such as forcing to stop support operation and saving support operation, are preferably fulfilled in response to user's active instruction based on user's intention.

The present invention relates to an operator system, a remote support method, and a program for the operator system, which are capable of receiving the input of user action for ongoing support operation.

According to an operator system including:
an electric appliance requested for support, the electric appliance being used by a user;
an operator server communicatively connected with the electric appliance requested for support through a public network; and
an operator terminal communicatively connected with the operator server through a local area network or a public network, in which
the electric appliance requested for support includes:
a support operation screen display module configured to display a screen during support operation for the electric appliance requested for support from the operator terminal; and
a user action notification module configured to receive input of user action from the user for support operation performed from the operator terminal and then to transmit the user action to the operator server; and
the operator server includes:
a user action receiving module configured to receive the user action; and
a user action execution module configured to carry out control related to support operation performed from the operator terminal based on the user action received by the user action receiving module.

According to this embodiment, in an operator system including an electric appliance requested for support, the electric appliance being used by a user, an operator server communicatively connected with the electric appliance requested for support through a public network, and an operator terminal communicatively connected with the operator server through a local area network or a public network, the electric appliance requested for support displays a screen during support operation for the electric appliance request for support from the operator terminal, and receives input of user action from the user for support operation performed from the operator terminal and then transmits the user action to the operator server. The operator server also receives the user action and carries out control related to support operation performed from the operator terminal based on the received user action.

According to one embodiment, the control related to support operation performed from the operator terminal records a screen of the support operation and forces to stop the support operation.

According to one embodiment, the operator system further including a support operation screen display device communicatively connected with the electric appliance requested for support and the operator server through a local area network or a public network, in which
the support operation screen display device includes:
a support operation screen receiving module configured to receive a screen during support operation performed from the operator terminal for the electric appliance requested for support;

a support operation screen display module configured to display the received screen on an output unit of the support operation screen display device; and a user action notification module configured to receive input of user action from the user for support operation performed from the operator terminal and then to transmit the user action to the operator server.

According to this embodiment, the operator system further including a support operation screen display device communicatively connected with the electric appliance requested for support and the operator server through a local area network or a public network, in which the support operation screen display device receives a screen during support operation performed from the operator terminal for the electric appliance requested for support, and displays the received screen on an output unit of the support operation screen display device. The support operation screen display device also receives input of user action from the user for support operation performed from the operator terminal and then transmits the user action to the operator server.

Accordingly, these embodiments of the present invention can provide an operator system receiving and processing input of user action for support operation during the support operation.

According to one embodiment, the electric appliance requested for support further includes:

an electric appliance detection module configured to detect an electric appliance connected with the local area network to which the electric appliance requested for support belongs;

an electric appliance information determination module configured to determine device type information of the electric appliance detected by the electric appliance detection module;

a network map generation module configured to generate a network map based on the device type information determined by the electric appliance information determination module and based on information on the support operation; and a network map display module configured to display the network map generated by the network map generation module together with the screen during support operation.

According to this embodiment, the electric appliance requested for support detects an electric appliance connected with the local area network to which the electric appliance requested for support belongs, determines device type information of the detected electric appliance, and generates a network map based on the determined device type information and based on information on the support operation. Then, the electric appliance requested for support displays the generated network map together with the screen during support operation.

According to one embodiment, a support operation screen display device further includes:

an electric appliance detection module configured to detect an electric appliance connected with the local area network to which the support operation screen display device belongs;

an electric appliance information determination module configured to determine device type information of the electric appliance detected by the electric appliance detection module;

a network map generation module configured to generate a network map based on the device type information determined by the electric appliance information determination module and based on information on the support operation; and a network map display module configured to display the network map generated by the network map generation module together with the screen during support operation.

According to this embodiment, the support operation screen display device detects an electric appliance connected with the local area network to which the support operation screen display device belongs, determines device type information of the electric appliance detected by the electric appliance detection module, and generates a network map based on the determined device type information and based on information on the support operation. Then, the support operation screen display device displays the generated network map together with the screen during support operation.

According to one embodiment, a remote support method executed by an operator system including an electric appliance requested for support, the electric appliance being used by a user, an operator server communicatively connected with the electric appliance requested for support through a public network, and an operator terminal communicatively connected with the operator server through a local area network or a public network, including the steps of:

by the electric appliance requested for support, displaying a screen during support operation for the electric appliance requested for support, the support operation performed from the operator terminal;

receiving input of user action from the user for support operation performed from the operator terminal and then transmitting the user action to the operator server;

by the operator server, receiving user action from the electric appliance requested for support; and carrying out control related to support operation performed from the operator terminal based on the received user action.

The present invention can provide an operator system, a remote support method, and a program for the operator system, which are capable of receiving input of user action for ongoing support operation.

DESCRIPTION OF EMBODIMENTS

Hereinafter, embodiments of the present invention will be described with reference to the attached drawings. However, this is illustrative only, and the technological scope of the present invention is not limited thereto.

The present invention will be explained below. According to the present invention, while an operator is carrying out support operation for an electric appliance 10, user action 900 input by a user, such as forcing to stop the support operation or starting to save the support operation, is transmitted to an operator server 200. The operator server 200 processing the received user action 900 fulfills the function of the operator system 1 based on user's intention. In addition, displaying a network map showing support operation information on the electric appliance 10 allows a user to easily know the status of the support operation, contributing to user's appropriate decision making.

Configuration of Operator System

Figure 1:
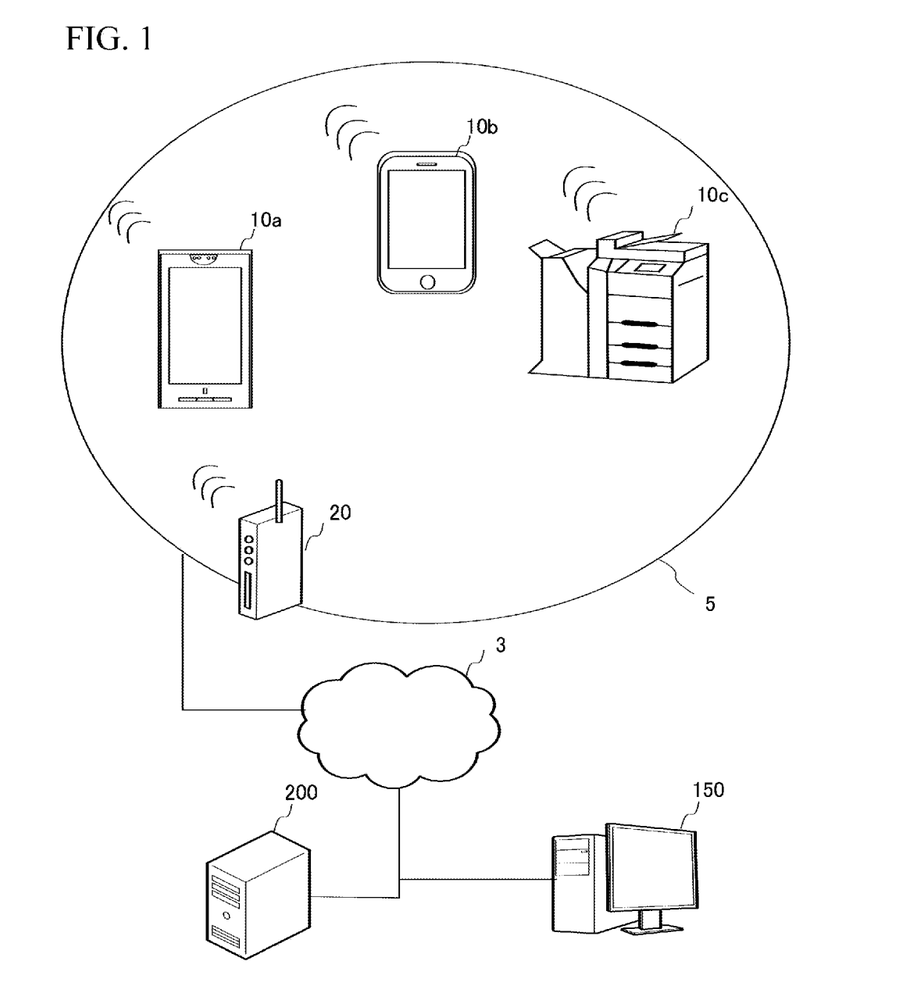
FIG. 1 shows an overall schematic diagram of an example operator system.

FIG. 1 is a system configuration diagram of the operator system 1 that is a preferred embodiment of the present invention. The operator system 1 includes electric appliances 10a, 10b, and 10c (hereinafter simply referred to as "electric appliance terminal 10"), an operator server 200, a public line network 3 (e.g., an Internet network, a third generation communication network, a fourth generation communication network), and an operator terminal 150.

Each electric appliance in the operator system 1 is connected through a local area network 5 (hereinafter referred to as "LAN"). The electric appliance 10 is connected with the operator server 200 or the operator terminal 150 through a public line network 3. The operator server 200 may be connected with the operator terminal 150 through a local area network or a public network 3. The communication in the operator system 1 may be wireless communication or wired communication. The electric appliance 10 may be communicatively connected with a public network 3 through a network device such as a router 20.

The electric appliance 10 is a general electric appliance for home and business uses enabling data communication and provided with a data storage unit and an input and output unit. The electric appliance includes information appliances such as a personal computer, a television, a telephone, a computer, a mobile phone, an information terminal 10a, a net book terminal, a slate terminal 10b, an electronic book terminal, a portable music player, an audio component, a content player, a printer, a facsimile machine, a copy machine 10c, a scanner machine, and an MFP (a multi-function peripheral device or a multi-function printer).

The operator terminal 150 is an information terminal used by an operator who provides support for an electric appliance 10.

The operator server 200 is a server relaying data processing between the electric appliance 10 and the operator terminal 150 and executing various processes.

Figure 2:
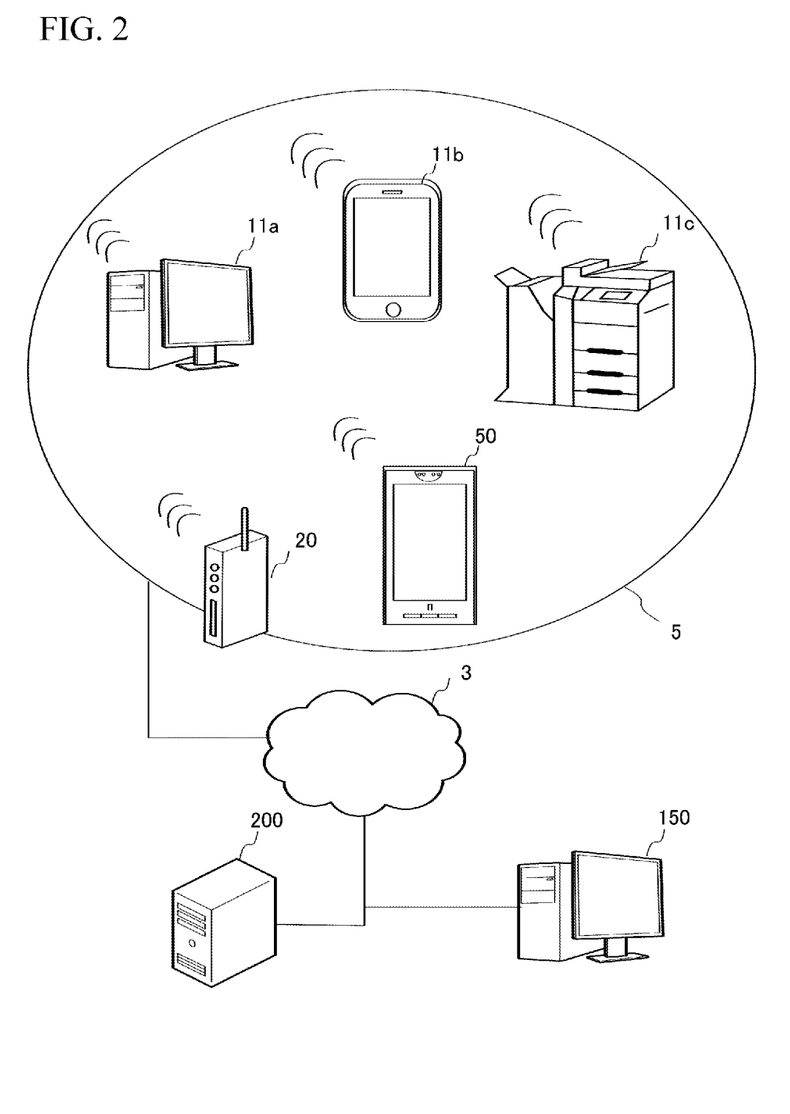
FIG. 2 shows an overall schematic diagram of another example operator system.

FIG. 2 shows an overall schematic diagram of the operator system 2 that is a preferred embodiment of the present invention. In the same way as that of the operator system 1, the operator system 2 includes electric appliances 11a, 11b, and 11c (hereinafter simply referred to as "electric appliance terminal 11"), an operator server 200, a public line network 3 (e.g., an Internet network, a third generation communication network, a fourth generation communication network), and an operator terminal 150.

Each electric appliance 11 is connected with a support operation screen display device 50 in the operator system 2 through LAN 5. The electric appliance 11 is connected with the operator server 200 or the operator terminal 150 through a public line network 3. The support operation screen display device 50 may be communicated with the operator server 200 through a public network 3 directly or through an electric appliance 11. The operator server 200 may be connected with the operator terminal 150 through a local area network or a public network 3. The communication in the operator system 2 may be wireless communication or wired communication. The electric appliance 11 may be communicatively connected with a public network 3 through a network device such as a router 20.

The electric appliance 11 is a domestic or business appliance capable of data communication. The electric appliance includes information appliances such as a personal computer 11a, a television, a telephone, a computer, a mobile phone, a handheld terminal, a net book terminal, a slate terminal 11b, an electronic book terminal, a portable music player, an audio component, a content player, a printer, a facsimile machine, a copy machine 11c, a scanner machine, and an MFP (a multi-function peripheral device or a multi-function printer). The electric appliance also includes home electric appliances such as a refrigerator, a washing machine, a dishwasher, a fan, an air conditioner, an electric stove, a rice cooker, and a microwave oven. The electric appliance also includes a light, a server, a router, a gateway, a network attached storage (hereinafter referred to as "NAS").

In the same way as that of the electric appliance 10, the support operation screen display device 50 is an electric appliance for home and business uses enabling data communication and provided with a data storage unit and an input and output unit. The support operation screen display device 50 does not necessarily need to be clearly distinguished from the electric appliance 11, so that an electric appliance 11 provided with a data storage unit and an input and output unit may be used as the support operation screen display device 50 depending on the situation.

Functions

Figure 3:
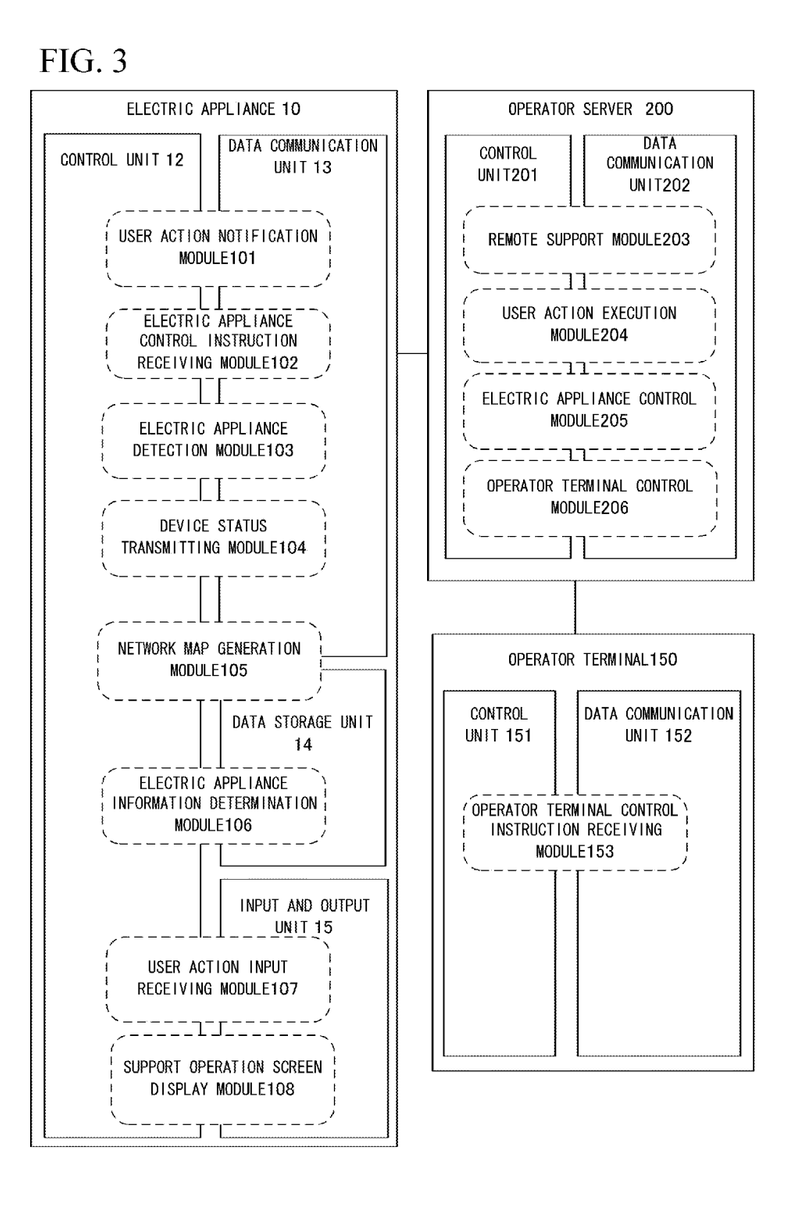
FIG. 3 shows a functional block diagram of an example operator server, an example electric appliance, and an example operator terminal.
Figure 4:
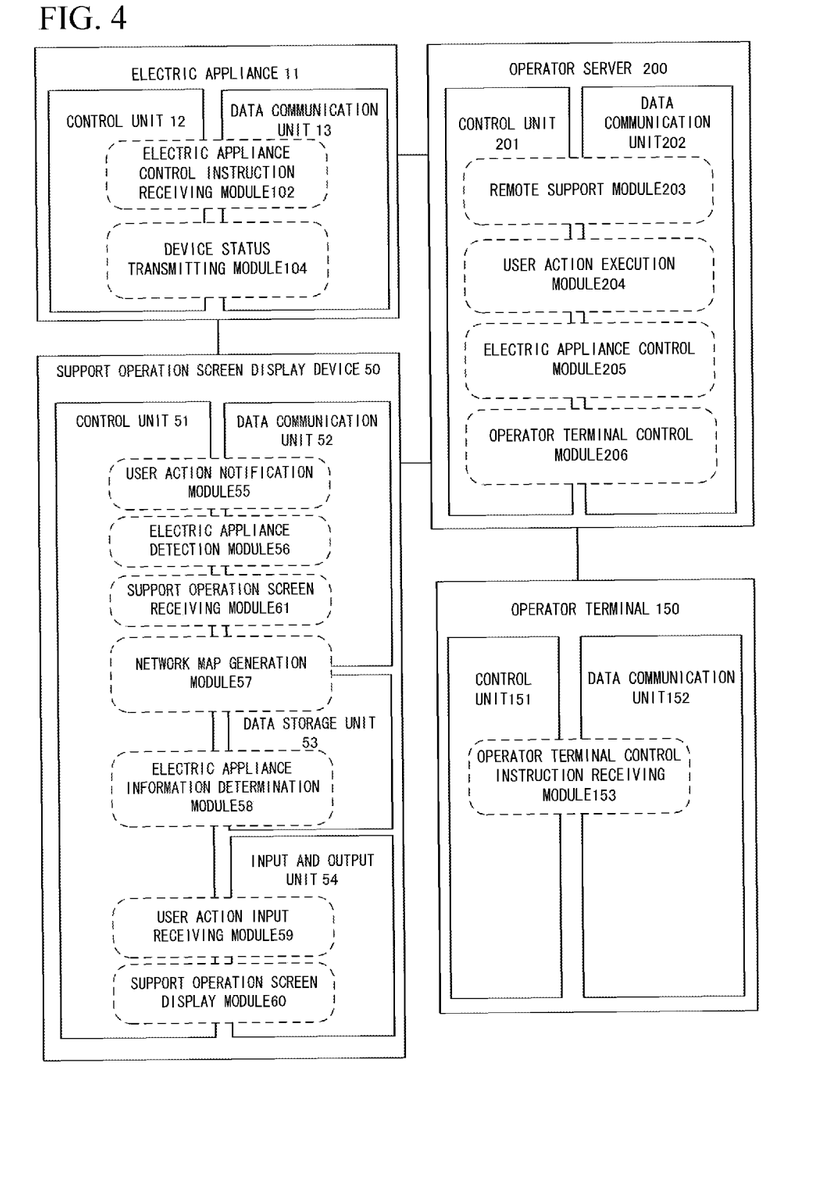
FIG. 4 shows a functional block diagram of another example electric appliance, an example support operation screen display device, the operator server, and the operator terminal.

The configuration of each device will be explained based on FIGS. 3 and 4. The operator server 200 may include a control unit 201 provided with a central processing unit (hereinafter referred to as "CPU"), random access memory (hereinafter referred to as "RAM"), read only memory (hereinafter referred to as "ROM"). The data communication unit 202 includes a device enabling the communication with other devices, for example, a Wireless Fidelity® or WiFi® enabled device complying with IEEE 802.11. The operator server 200 may also be a typical server provided with a data storage unit storing data and files, such as a hard disk, semiconductor memory, a recording medium, or a memory card.

In the operator server 200, the control unit 201 cooperates with the data communication unit 213 by reading a predetermined program to achieve a remote support module 203, a user action execution module 204, an electric appliance control module 205, and an operator terminal control module 206.

As the same way as that of the operator server 200, the electric device 10 includes a control unit 12 provided with a CPU, RAM, and ROM. The data communication unit 13 includes a device achieving data communication with other electric appliances and with a wireless access point, such as a device enabling the communication with other electric appliances, for example, a Wireless Fidelity® or WiFi® enabled device complying with IEEE 802.11 or a device connectable through a fixed line. The electric appliance 10 also include a display unit outputting and displaying data and images that are controlled by the control unit; and a touch panel, a keyboard, and a mouse that receive input from a user and an operator as an input and output unit 15. The electric appliance 10 also includes a data storage unit 14 storing data and files, such as a hard disk, semiconductor memory, a recording medium, or a memory card.

In the electric appliance 10, the control unit 12 cooperates with the data communication unit 13 by reading a predetermined program to achieve a user action notification module 101, an electric appliance control instruction receiving module 102, an electric appliance detection module 103, and a device status transmitting module 104. Furthermore, in the electric appliance 10, the control unit 12 cooperates with the data communication unit 13 and the data storage unit 14 by reading a predetermined program to achieve a network map generation module 105. Yet furthermore, in the electric appliance 10, the control unit 12 cooperates with the data storage unit 14 by reading a predetermined program to achieve an electric appliance information determination module 106. Still yet furthermore, in the electric appliance 10, the control unit 12 cooperates with the input and output unit 15 by reading a predetermined program to achieve a user action input receiving module 107 and a support operation screen display module 108.

As the same way as that of the operator server 200, the operator terminal 150 includes a control unit 151 provided with a CPU, RAM, and ROM. The data communication unit 152 includes a device achieving data communication with other electric appliances and with a wireless access point, such as a device enabling the communication with other electric appliances, for example, a Wireless Fidelity® or WiFi® enabled device complying with IEEE 802.11 or a device enabling the connection through a fixed line. The operator terminal 150 also includes a display unit outputting and displaying data and images that are controlled by the control unit; and a touch panel, a keyboard, and a mouse that receive input from a user and an operator as an input and output unit. The operator terminal 10 may also be a typical terminal device provided with a data storage unit storing data and files, such as a hard disk, semiconductor memory, a recording medium, or a memory card.

Furthermore, in the operator terminal 150, the control unit 151 cooperates with the data communication unit 152 by reading a predetermined program to achieve an operator terminal control instruction receiving module 153.

As the same way as that of the operator server 200, the electric device 10 includes a control unit 12 provided with a CPU, RAM, and ROM. The data communication unit 13 includes a device achieving data communication with other electric appliances and with a wireless access point, such as a device enabling the communication with other electric appliances, for example, a Wireless Fidelity® or WiFi® enabled device complying with IEEE 802.11 or a device enabling the connection through a fixed line.

In the electric appliance 11, the control unit 12 cooperates with the data communication unit 13 by reading a predetermined program to achieve an electric appliance control instruction receiving module 102 and a device status transmitting module 104.

As the same way as that of the electric appliance 10, the support operation screen display device 50 includes a control unit 51 provided with a CPU, RAM, and ROM. The data communication unit 52 includes a device achieving data communication with other electric appliances and with a wireless access point, such as a device enabling the communication with other electric appliances, for example, a Wireless Fidelity® or WiFi® enabled device complying with IEEE 802.11 or a device enabling the connection through a fixed line. The support operation screen display device 50 also includes a data storage unit 53 storing data and files, such as a hard disk, semiconductor memory, a recording medium, or a memory card. The support operation screen display device 50 also includes a display unit outputting and displaying data and images that are controlled by the control unit; and a touch panel, a keyboard, and a mouse that receive input from a user and an operator as an input and output unit 54.

In the support operation screen display device 50, the control unit 51 cooperates with the data communication unit 52 by reading a predetermined program to achieve a user action notification module 55, an electric appliance detection module 56, and a support operation screen receiving module 61. Furthermore, in the support operation screen display device 50, the control unit 51 cooperates with the data communication unit 52 and the data storage unit 53 by reading a predetermined program to achieve a network map generation module 57. Yet furthermore, in the support operation screen display device 50, the control unit 51 cooperates with the data storage unit 53 by reading a predetermined program to achieve an electric appliance information determination module 58. Still yet furthermore, in the support operation screen display device 50, the control unit 51 cooperates with the input and output unit 54 by reading a predetermined program to achieve a user action input receiving module 59 and an support operation screen display module 60.

Remote Support Process

Figure 5:
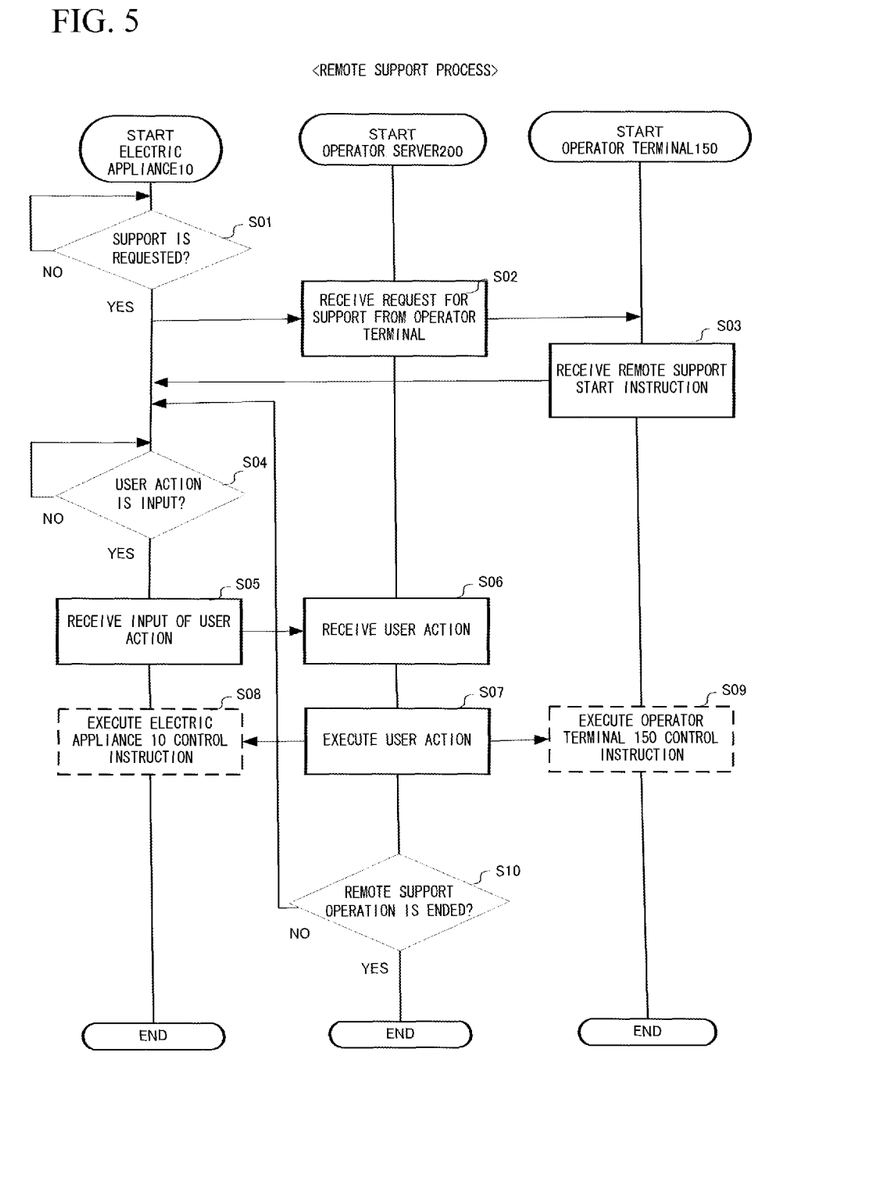
FIG. 5 shows a flowchart of an example remote support process executed by the electric appliance, the operator server, and the operator terminal.

FIG. 5 shows a flowchart of an example remote support process executed by the electric appliance 10, the operator server 200, and the operator terminal 150. The process executed by the module of each of the above-mentioned devices will be explained together with the present process.

The electric appliance 10 receives operation requested by a user for support (Step S01). In the electric appliance 10, for example, an application to receive remote support is installed. Accordingly the electric appliance 10 receives the operation to start this application from the user, accesses a predetermined web page from a predetermined electric appliance 10, and transmits a message, so as to request support from the operator server 200.

If the electric appliance 10 receives operation requested by a user for support (Step S01: "Yes"), the electric appliance 10 connects to the operator server 200, notifies the operator server 100 of support request, and moves the process to the step S02. If the electric appliance 10 does not receives operation requested by a user for support (Step S01: "NO"), the step S01 is repeated.

The remote support module 203 of the operator server 200 then receives request for support from the operator terminal 150 (Step S02). Specifically, the remote support module 203 notifies one or more operator terminals 150 of the receipt of support request and receives instruction to start remote support performed from the operator terminal 150.

When the operator terminal 150 receives a remote support start instruction from an operator to the electric appliance 10

(Step S03), the operator server 200 connects the operator terminal 150 with the electric appliance 10. As the same way as that of the remote operation from an operator to a general terminal through remote login, the screen information being displayed on the display unit of the electric appliance 10 may be viewed on the operator terminal 150. The electric appliance 10 may be remotely operated from the operator terminal 150. At this point, the operator terminal 150 can execute the support process for the electric appliance 10.

Figure 8:
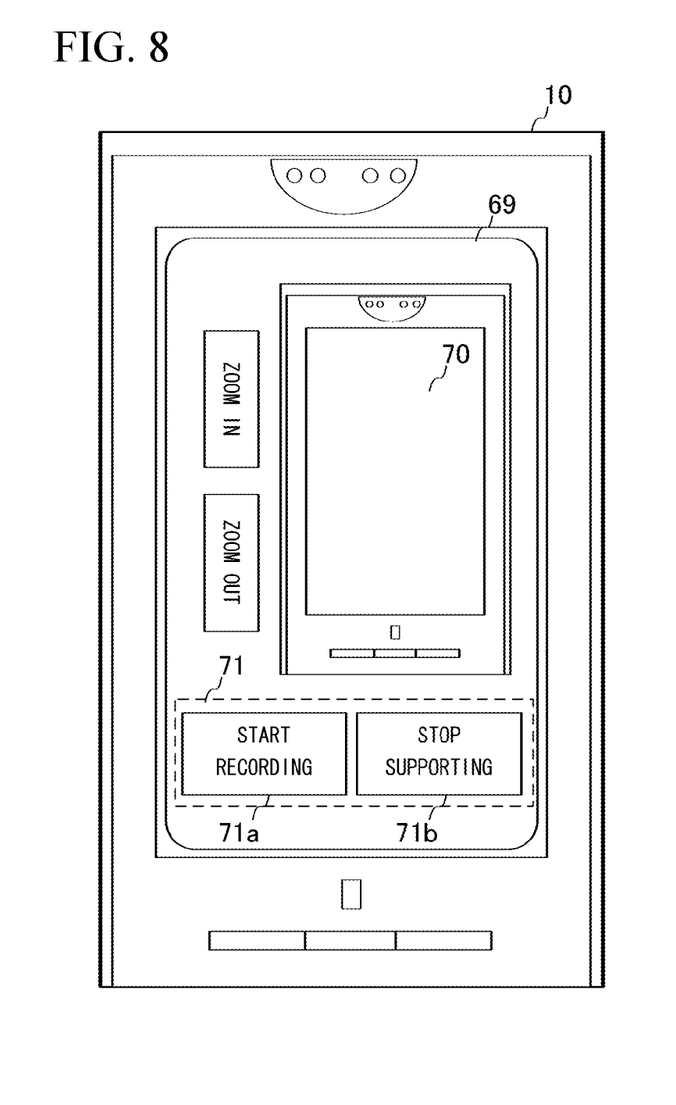
FIG. 8 shows an example screen image of the support operation screen displayed by the support operation screen display module of the electric appliance.

While an operator is carrying out support operation by using the operator terminal 150, in the operator system 1, the support operation screen display module 108 of the electric appliance 10 displays a support operation screen 69 as shown in FIG. 8 on the input and output unit 15 of the electric appliance 10. The support operation screen 69 provided with a support operation screen display unit 70 and a user action input interface 71.

While an operator is carrying out support operation by using the operator terminal 150, the user action input receiving module 107 of the electric appliance 10 receives user action 900 for the support operation from a user (Step S04). For example, the user action 900 includes forcing stop action to force to stop remote support operation, starting record action to start recording a content displayed on the support operation screen display unit, and stopping record action to stop recording started by the starting record action.

The input of user action 900 is achieved by input action to a device based on user's intention, such as clicking a user action input interface 71 of the support operation screen with a pointing device or the like or pressing a key or a button of the keyboard set as the short cut of the input and output unit by using the input and output unit of the electric appliance 10 or the support operation screen display device 50. For example, when the button 71a shown in FIG. 8 is clicked with a mouse, starting record action is input. When the button 71b is clicked with a mouse, forcing stop action is input.

If the electric appliance 10 does not receives input of user action operation from a user (Step S01: "NO"), the step S04 is repeated. If the remote support operation ends during this repeat, the remote support process executed by the operator system 1 is ended.

If the electric appliance 10 receives user action 900 for the support operation from a user (Step S04: "YES"), the user action notification module 101 of the electric appliance 10 transmits the receipt of input of user action and the content of the user action to the operator server 200 (Step S05).

The user action execution module 204 of the operator server 200 receives the user action 900 from the electric appliance 10 (Step S06). The user action execution module 204 executes a process associated with the support operation based on the received user action 900 (Step S07).

In the process, for example, if the received user action 900 is starting record action, a screen buffer to be displayed on the support operation screen display unit 70 of the electric appliance 10, which is relayed by the operator server 200, is written in the storage unit of the operator server 200. If the received user action 900 is stopping record action, the written screen buffer is encoded as one video file, and written in the storage unit of the operator server 200 in a form readable by a video replay program, and then removed.

In the process performing the user action 900, if there is a process required to be executed by the control unit of the electric appliance 10, the electric appliance control module 205 of the operator server 200 transmits instruction to execute this process to the electric appliance 10, and then the electric appliance control instruction receiving module 102 of the electric appliance 10 receives and executes the instruction (Step S08). This instruction may not be in a form directly readable by the control unit of the electric appliance 10, but may be a unique script that only the program executed on the electric appliance 10 for remote support.

In the process performing the user action 900, if there is a process required to be executed by the control unit of the operator terminal 150, the operator terminal control module 206 of the operator server 200 transmits instruction to execute this process to the operator terminal 150, and then the operator terminal control instruction receiving module 153 of the operator terminal 150 receives and executes the instruction (Step S09). The format of the instruction is the same as that in the step S08.

The process required to be executed by the control unit of the electric appliance 10, for example, transmits the video data stored in the storage unit of the operator server 200 to the electric appliance 10 to store the video data in the storage unit of the electric appliance 10 during the processing of stopping record action. The process required to be executed by the control unit of the operator terminal 150, for example, intercepts the relay in the operator server 200, brings a remote support program executed on the operator terminal 150 into a standby state, and enables the communication only by a remote support program executed on the electric appliance 10 and by instant messages and voice during the processing of forcing stop action for remote support operation.

However, the operator server 200 is not essential to have the electric appliance control module 205 or the operator terminal control module 206. If the operator server is not provided with the electric appliance control module 205, the step S08 is skipped in the remote support process. If the operator server is not provided with the operator terminal control module 206, the step S09 is skipped in the remote support process.

Finally, the operator server 200 determines whether or not the remote support operation is ended by user action 900 (Step S10). If the remote support operation is not ended, the process returns to just before the step S04, and then the remote support operation is continued.

This is the procedure of an example remote support process executed by the electric appliance 10, the operator server 200, and the operator terminal 150. The procedure of the electric appliance 10 of the operator system 1 has mainly been explained. The support operation screen display device 50 has the same function as that of the electric appliance 10. Accordingly, each module of the support operation screen display device can execute the same remote support process even in the operator system 2. The remote support process executed by the operator system 2 will be explained below with reference to FIG. 6.

Figure 6:
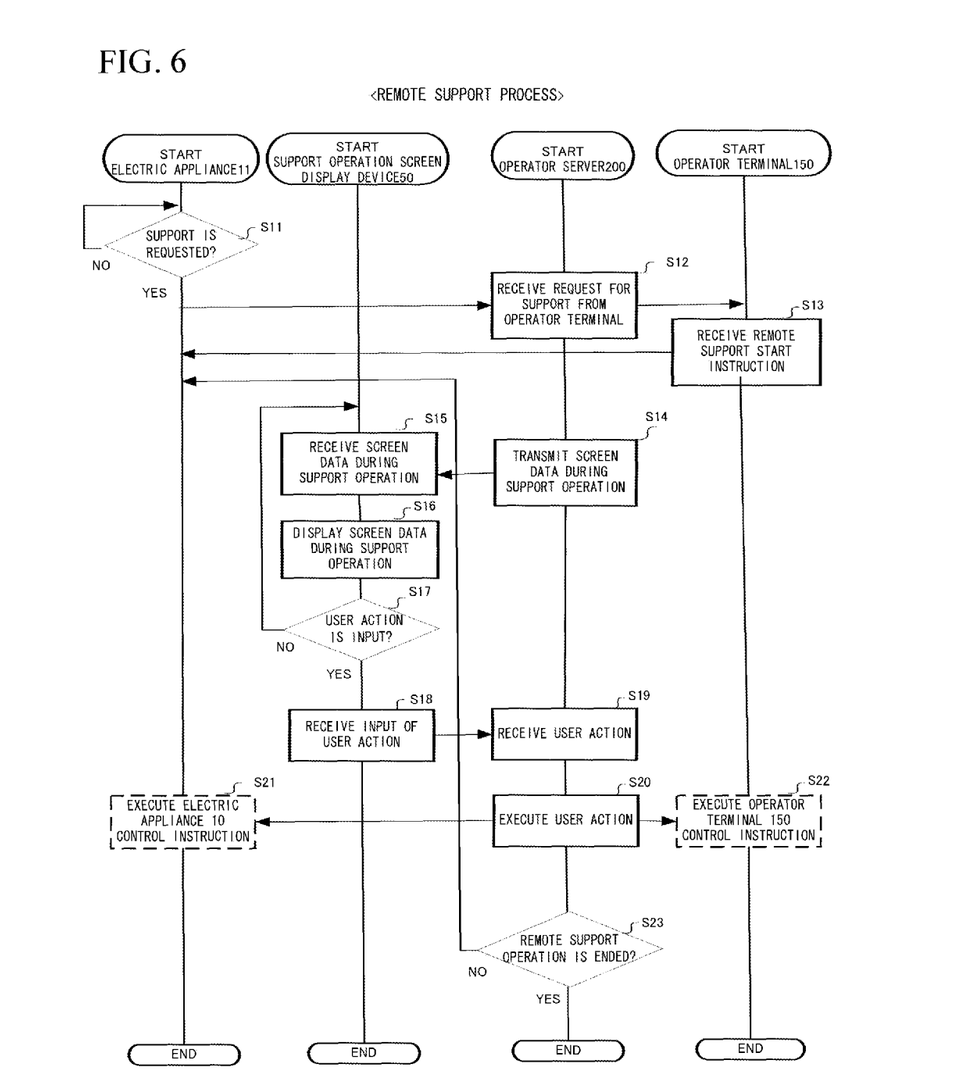
FIG. 6 shows a flowchart of an example remote support process executed by the electric appliance, the support operation screen display device, the operator server, and the operator terminal.

FIG. 6 shows a flowchart of an example remote support process executed by the electric appliance 11, the support operation screen display device 50, the operator server 200, and the operator terminal 150. The process of the steps from S11 to S13 shown in FIG. 6, in which the electric appliance 10 is replaced with the electric appliance 11 in the steps from S01 to S03 shown in FIG. 5, is executed. Then, the operator server 200 connects the operator terminal 150 with the electric appliance 11.

In the operator system 2, the remote support module 203 of the operator server 200 transmits a screen data during support operation for the support operation screen display device 50 (Step S14). The support operation screen receiving module 61 of the support operation screen display device 50 receives this screen data during support operation (Step S15). The support operation screen display module 60 of the support operation screen display device 50 displays the received screen data on the input and output unit 54 (Step S16). On the support operation screen display device 50, the support operation screen 69 can be viewed. At this point, the operator terminal 150 can execute the support process for the electric appliance 11.

While an operator is carrying out support operation by using the operator terminal 150, the user action input receiving module 59 of the support operation screen display device 50 receives user action 900 for the support operation from a user (Step S17).

If the support operation screen display device 50 does not receives input of user action from a user (Step S17: "NO"), the process is returned to the step S15. If the remote support operation ends during this repeat, the remote support process executed by the operator system 2 is ended.

If the support operation screen display device 50 receives user action 900 for the support operation from a user (Step S17: "YES"), the user action notification module 55 of the support operation screen display device 50 transmits the receipt of input of user action and the content of the user action to the operator server 200 (Step S18).

The user action execution module 204 of the operator server 200 receives the user action 900 from the support operation screen display device 50 (Step S19). The user action execution module 204 executes a process associated with the support operation based on the received user action 900 (Step S20). The process of the steps from S21 to S23 that will be executed afterward is the same as that of the steps from S08 to S10 shown in FIG. 5, in which the electric appliance 10 is replaced with the electric appliance 11.

This is the procedure of a remote support process executed by the electric appliance 11, the support operation screen display device 50, the operator server 200, and the operator terminal 150.

Process of Displaying Network Map

Figure 7:
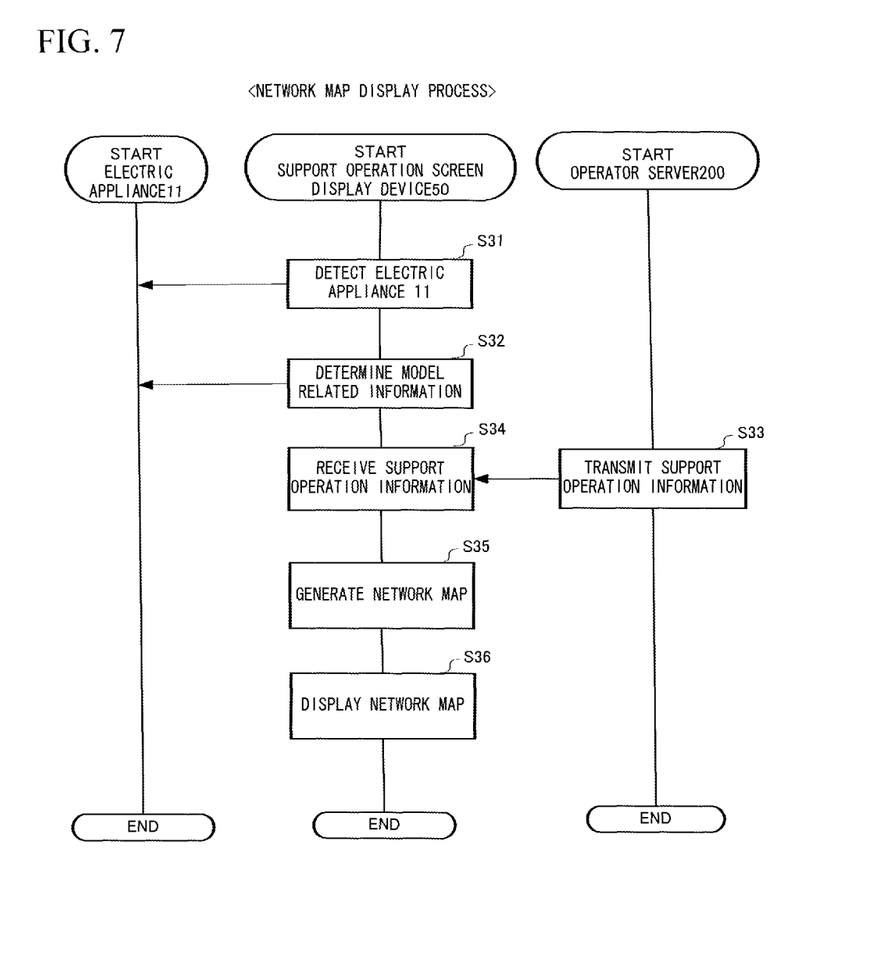
FIG. 7 shows a flow chart of an example network map display process executed by the electric appliance, the support operation screen display device, and the operator server.

FIG. 7 shows a flow chart of an example network map display process executed by the electric appliance 11, the support operation screen display device 50, and the operator terminal 150. The process executed by the module of the above-mentioned devices will be explained together with the present process.

The electric appliance detection module 56 of the support operation screen display device 50 detects an electric appliance 11 existing in the local area network to which the support operation screen display device 50 belongs (Step S31).

The electric appliance information determination module 58 of the support operation screen display device 50 determines model related information by transmitting and receiving a predetermined packet to and from each electric appliance 11 existing in the same local area network (step S32). The model related information is information on the device type including the model name and the manufacturer name of the electric appliance 11. In the present process, a process to determine the type of each electric appliance connected with a network by transmitting and receiving a packet may be used as described in PLT 2.

The remote support module 203 of the operator server 200 transmits support operation information to the support operation screen display device 50 (Step S33). The network map generation module 57 of the support operation screen display device 50 receives support operation information from the operator server 200 (Step S34).

The support operation information is a state of support operation for the electric appliance 11 and may include the information that support operation is currently carried out for the electric appliance 11 and the information that the electric appliance 11 is standby being connected with the operator terminal 150. The operator server 200 does not necessarily need to transmit the support operation information itself. Accordingly, the operator server 200 but may acquire support operation information by matching the IP address or the MAC address of the electric appliance 11 for which support operation is carried out, which is included in information on a support operation screen transmitted by the remote support module 203 of the operator server 200, to information on the electric appliance 11 detected by the electric appliance detection module 56.

Figure 9:
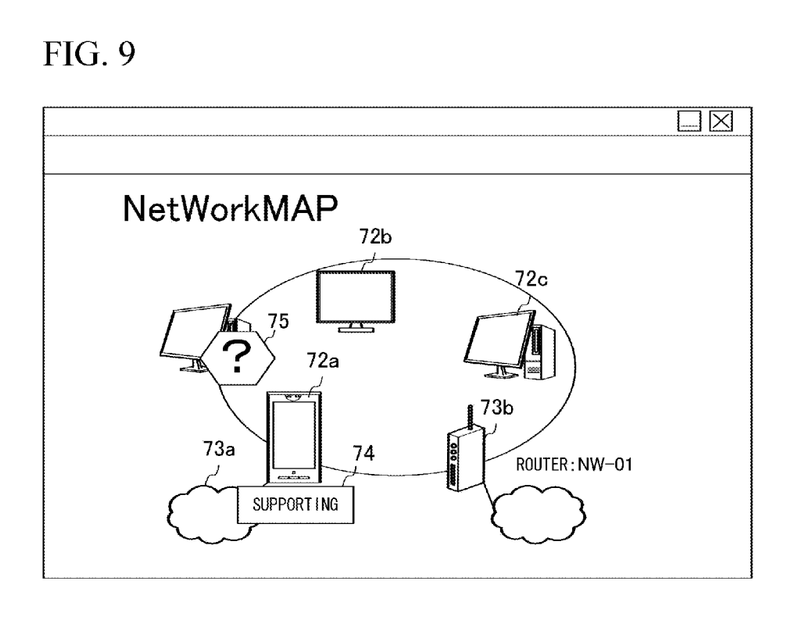
FIG. 9 shows an example screen image of the network map generated by the network map generation module of the electric appliance or by the network map network map generation module of the support operation screen display device.

The network map generation module 57 of the support operation screen display device 50 generates a network map based on the model related information and the received support operation information. (Step S35). In the support operation screen display device 50, icons (hereinafter referred to as "electric appliance icons") for electric appliances to be displayed on a network map are associated with model related information and stored, preliminarily. As shown in FIG. 9, electric appliance icons 72 corresponding to a portable terminal 72a, a television 72b, a personal computer 72c, and the like, respectively, are displayed based on the determined model related information to generate a network map. Furthermore, the local area network connected with an electric appliance 11 is represented by a circle or the like, and a public network 3 is represented by a cloud-shaped icon 73a. When detected, a router is represented by a router icon 73b.

As shown in FIG. 9, based on the support operation information of each electric appliance 11, a support operation information icon 74 is displayed on the network map. When support operation is simultaneously carried out for a plurality of electric appliances 11, a plurality of support operation information icons 74 are displayed on the network map.

The support operation screen display device 50 may not able to determine model related information even after detecting the electric appliance 11. In this case, the undetermined icon 75 is displayed near the electric appliance icon 72 of this electric appliance 11 to show that the model related information of this electric appliance 11 was not able to be determined.

The support operation screen display device 50 may not generate a network but may receive a network map generated in the operator server 200 by the same processing as described above, instead. The device status may be acquired by using the device status transmitting module 104 which is a program preliminarily installed in the electric appliance 11. The device status transmitting module 104 has a function to acquire and transmit the device status of the electric appliance 11 to the support operation screen display device 50 periodically.

Figure 10:
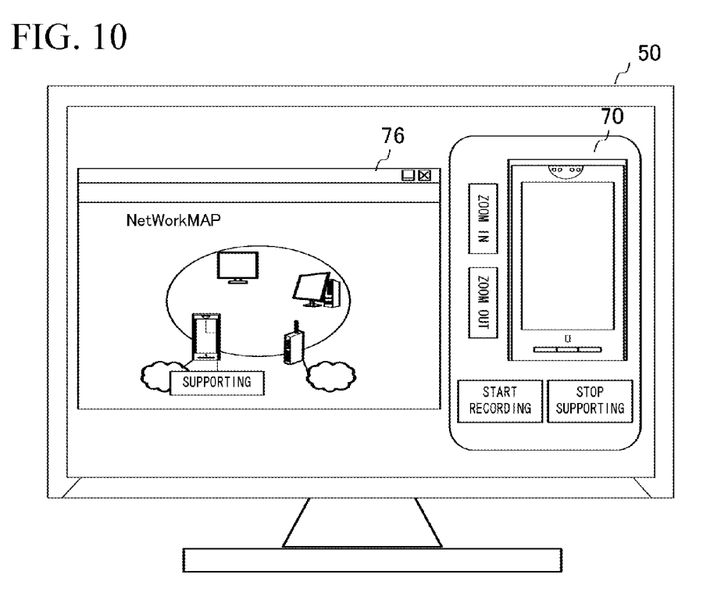
FIG. 10 shows an example screen image including the support operation screen and the network map screen that are displayed by the support operation screen display module of the support operation screen display device.

The support operation screen display module 60 displays the network map generated by the above-mentioned processing on the input and output unit 54 of the support operation screen display device as a network map screen 76 together with the support operation screen 69 (Step S36). FIG. 10 shows an example image of the support operation screen 69 and the network map screen 76 that are displayed by the support operation screen display module 60.

This is the display processes executed by the support operation screen display device 50 for an electric appliance during support operation. The procedure executed by each module of the support operation screen display device 50 in the operator system 2 is explained above. In the electric appliance 10 in the operator system 1, the module with the same function as that of the support operation screen display device 50 is performed so that the same process as that of the support operation screen display device 50 can be executed.

To achieve the functionality as described above, a computer (including a CPU, an information processor, or various terminals) reads and executes a predetermined program. For example, a program is provided recorded on a computer-readable storage medium such as a floppy disk, a CD (e.g., CD-ROM), or a DVD (e.g., DVD-ROM or DVD-RAM), or the like. In this case, a computer reads a program from the storage medium, forwards the program to internal or external storage to store the program therein, and executes the program. For example, the program may be previously recorded in a memory device (storage medium) such as a magnetic disk, an optical disk, or a magnetic optical disk and then provided from the memory device to a computer through a communication line.

The embodiments of the present invention are described above, but the present invention is not limited thereto. The effects described in the embodiments of the present invention are merely listed as the most suitable effects produced from the present invention. The effects of the present invention are not limited to those described in the embodiments of the present invention.

REFERENCE SIGNS LIST 1 operator system
10 electric appliance
50 support operation screen display device
150 Operator terminal
200 Operator server

The invention claimed is:

1. An operator system comprising: a processor, an electric appliance requested for support, the electric appliance being used by a user;
an operator server communicatively connected with the electric appliance requested for support through a public network; and
an operator terminal communicatively connected with the operator server through a local area network or a public network; wherein
the electric appliance requested for support includes:
a support operation screen display module configured to display a screen during support operation for the electric appliance requested for support from the operator terminal;
a user action notification module configured to receive input of user action from the user for support operation performed from the operator terminal and then to transmit the user action to the operator server;
a network map generation module configured to generate a network map based on device type information of at least one electric appliance connected with the local area network to which the electric appliance requested for support belongs and based on information on the support operation; and
a network map display module configured to display the network map together with the screen during support operation, the displayed network map includes icons corresponding to the electric appliance requested for support and the at least electric appliance connected with the local area network and an icon representing the support operation information for the electric appliance requested for support; and
the operator server includes:
a user action receiving module configured to receive the user action; and
a user action execution module configured to carry out control related to support operation performed from the operator terminal based on the user action received by the user action receiving module,
wherein the control related to support operation performed from the operator terminal includes a control for recording a screen of the support operation and a control for forcing to stop the support operation.

2. The operator system according to claim 1, further comprising a support operation screen display device communicatively connected with the electric appliance requested for support and the operator server through a local area network or a public network, wherein
the support operation screen display device includes:
a support operation screen receiving module configured to receive a screen during support operation performed from the operator terminal for the electric appliance requested for support;
a support operation screen display module configured to display the received screen on an output unit of the support operation screen display device; and
a user action notification module configured to receive input of user action from the user for support operation performed from the operator terminal and then to transmit the user action to the operator server.

3. The operator system according to claim 2, wherein the support operation screen display device further includes:
an electric appliance detection module configured to detect the at least one electric appliance connected with the local area network to which the support operation screen display device belongs; and
an electric appliance information determination module configured to determine the device type information of the electric appliance detected by the electric appliance detection module.

4. The operator system according to claim 1, wherein the electric appliance requested for support further includes:
an electric appliance detection module configured to detect the at least one electric appliance connected with the local area network to which the electric appliance requested for support belongs; and
an electric appliance information determination module configured to determine the device type information of the electric appliance detected by the electric appliance detection module.

5. The operator system according to claim 1, wherein when the user action is starting recording the screen of the support operation, the control for recording the screen of the support operation includes writing a screen buffer to be displayed on the support operation screen display module of the electric appliance in a storage unit.

6. The operator system according to claim 5, wherein when the user action is stopping recording the screen of the support operation, the control for recording the screen of the support operation further includes encoding the screen buffer as a video file and writing the video file in the storage unit.

7. The operator system according to claim 6, wherein when the user action is stopping recording the screen of the support operation, the control for recording the screen of the support operation further includes transmitting the video file to the electric appliance.

8. A remote support method executed by an operator system including an electric appliance requested for support, the electric appliance being used by a user, an operator server communicatively connected with the electric appliance requested for support through a public network, and an operator terminal communicatively connected with the operator server through a local area network or a public network, comprising the steps of:

by the electric appliance requested for support,
displaying a screen during support operation for the electric appliance requested for support, the support operation performed from the operator terminal;
receiving input of user action from the user for support operation performed from the operator terminal and then transmitting the user action to the operator server;
generating a network map based on device type information of a plurality of electric appliances connected with the local area network to which the electric appliance requested for support belongs and based on information on the support operation;
displaying the network map together with the screen during support operation, the displayed network map includes icons corresponding to the electric appliances and an icon representing the support operation information for the electric appliance requested for support;
by the operator server,
receiving user action from the electric appliance requested for support; and
carrying out control related to support operation performed from the operator terminal based on the received user action,
wherein the control related to support operation performed from the operator terminal includes a control for recording a screen of the support operation and a control for forcing to stop the support operation.

9. The remote support method according to claim 8, wherein when the user action is starting recording the screen of the support operation, the control for recording the screen of the support operation includes writing a screen buffer to be displayed on the support operation screen display module of the electric appliance in a storage unit.

10. The remote support method according to claim 9, wherein when the user action is stopping recording the screen of the support operation, the control for recording the screen of the support operation further includes encoding the screen buffer as a video file, and writing the video file in the storage unit.

11. The remote support method according to claim 10, wherein when the user action is stopping recording the screen of the support operation, the control for recording the screen of the support operation further includes transmitting the video file to the electric appliance.

12. A computer program product for use in an operator system including a processor and an electric appliance requested for support, the electric appliance being used by a user, an operator server communicatively connected with the electric appliance requested for support through a public network, and an operator terminal communicatively connected with the operator server through a local area network or a public network, comprising a non-transitory computer usable medium having a set of instructions physically embodied therein, the set of instructions including computer readable code,
which when executed by the operator system causes the electric appliance requested for support to:
display a screen during support operation for the electric appliance requested for support, the support operation performed from the operator terminal;
receive input of user action from the user for support operation performed from the operator terminal, and then transmitting the user action to the operator server;
generate a network map based on device type information of a plurality of electric appliances connected with the local area network to which the electric appliance requested for support belongs and based on information on the support operation; and
display the network map together with the screen during support operation, the displayed network map includes icons corresponding to the electric appliances and an icon representing the support operation information for the electric appliance requested for support; and
which when executed by the operator system causes the operator server to:
receive user action from the electric appliance requested for support; and
carry out control related to support operation performed from the operator terminal based on the received user action,
wherein the control related to support operation performed from the operator terminal includes a control for recording a screen of the support operation and a control for forcing to stop the support operation.

13. The computer program product to claim 12, wherein when the user action is starting recording the screen of the support operation, the control for recording the screen of the support operation includes writing a screen buffer to be displayed on the support operation screen display module of the electric appliance in a storage unit.

14. The computer program product according to claim 13, wherein when the user action is stopping recording the screen of the support operation, the control for recording the screen of the support operation further includes encoding the screen buffer as a video file, and writing the video file in the storage unit.

15. The computer program product according to claim 14, wherein when the user action is stopping recording the screen of the support operation, the control for recording the screen of the support operation further includes transmitting the video file to the electric appliance.

* * * * *